(12) United States Patent
Meckes et al.

(10) Patent No.: US 11,383,108 B2
(45) Date of Patent: Jul. 12, 2022

(54) OXYGEN MASK ASSEMBLY WITH OPTIMIZED PACKAGE SIZE

(71) Applicant: SAFRAN CABIN INC., Huntington Beach, CA (US)

(72) Inventors: Rudiger Meckes, Berkenthin (DE); Marco Hollm, Oelixdorf (DE); Etienne Tomasena, Lübeck (DE); Andreas Westphal, Eutin (DE)

(73) Assignee: SAFRAN CABIN INC., Huntington Beach, CA (US)

( * ) Notice: Subject to any disclaimer, the term of this patent is extended or adjusted under 35 U.S.C. 154(b) by 512 days.

(21) Appl. No.: 16/518,249

(22) Filed: Jul. 22, 2019

(65) Prior Publication Data
US 2020/0030642 A1    Jan. 30, 2020

Related U.S. Application Data

(60) Provisional application No. 62/703,334, filed on Jul. 25, 2018.

(51) Int. Cl.
| | |
|---|---|
| *A62B 7/12* | (2006.01) |
| *A62B 9/00* | (2006.01) |
| *A62B 9/02* | (2006.01) |
| *A62B 18/02* | (2006.01) |
| *F16L 11/12* | (2006.01) |

(52) U.S. Cl.
CPC ............... *A62B 7/12* (2013.01); *A62B 9/006* (2013.01); *A62B 9/02* (2013.01); *A62B 18/02* (2013.01); *F16L 11/121* (2013.01)

(58) Field of Classification Search
CPC .. A62B 7/12; A62B 9/006; A62B 9/02; A62B 18/02; F16L 11/121; F16L 3/26; F16L 3/22; H02G 3/0487; H02G 3/04; H02G 3/30; Y10T 403/61; Y10T 403/38
See application file for complete search history.

(56) References Cited

U.S. PATENT DOCUMENTS

| | | | | |
|---|---|---|---|---|
| 2,583,026 A | * | 1/1952 | Swift | H01B 7/188 |
| | | | | 264/171.18 |
| 2,888,511 A | * | 5/1959 | Guritz | H01B 7/06 |
| | | | | 174/117 R |
| 3,392,724 A | * | 7/1968 | Cowley | A61M 16/06 |
| | | | | 222/541.6 |

(Continued)

FOREIGN PATENT DOCUMENTS

| | | | | |
|---|---|---|---|---|
| EP | 1220398 A2 | * | 7/2002 | ............ F16L 3/222 |
| EP | 1220398 A3 | | 1/2003 | |
| KR | 20120025353 | | 3/2012 | |

OTHER PUBLICATIONS

Extended Search Report issued in European Application 19188417.0-1010.

*Primary Examiner* — Tu A Vo
(74) *Attorney, Agent, or Firm* — Jeffer Mangels Butler & Mitchell LLP; Brennan C. Swain, Esq.

(57) ABSTRACT

A hose that includes a main body portion that defines a lumen extending therethrough and includes an outer surface, at least a first axially extending protrusion extending outwardly from the main body portion, and at least a first axially extending slot defined in the outer surface of the main body portion. The hose defines a hose axis. A portion of the first axially extending protrusion is secured in a portion of the first axially extending slot.

9 Claims, 6 Drawing Sheets

(56) References Cited

U.S. PATENT DOCUMENTS

| | | | | |
|---|---|---|---|---|
| 3,505,996 A * | 4/1970 | Cowley | ............... | A62B 7/02 |
| | | | | 222/541.6 |
| 3,505,997 A * | 4/1970 | Cowley | ............... | A62B 7/02 |
| | | | | 128/206.28 |
| 3,580,250 A * | 5/1971 | Oroza | ............... | A62B 7/08 |
| | | | | 422/120 |
| 3,744,489 A * | 7/1973 | Munro | ............... | A61F 6/142 |
| | | | | 128/839 |
| 4,685,456 A * | 8/1987 | Smart | ............... | A61M 16/0672 |
| | | | | 128/207.18 |
| 7,795,539 B2 * | 9/2010 | Thuot | ............... | H01B 7/0275 |
| | | | | 174/113 R |
| 8,447,062 B2 * | 5/2013 | Lin | ............... | H04R 1/10 |
| | | | | 381/384 |
| 8,584,674 B1 * | 11/2013 | Poliard | ............... | A62B 7/02 |
| | | | | 128/204.21 |
| 2002/0085828 A1 * | 7/2002 | McGarvey | ............... | H02G 3/30 |
| | | | | 385/147 |
| 2002/0189617 A1 * | 12/2002 | Cordero | ............... | B64D 11/00 |
| | | | | 128/205.25 |
| 2003/0000530 A1 * | 1/2003 | McDonald | ............... | A62B 18/08 |
| | | | | 128/205.25 |
| 2008/0006436 A1 * | 1/2008 | Sun | ............... | H01B 7/40 |
| | | | | 174/117 F |
| 2009/0242064 A1 * | 10/2009 | Lai | ............... | H02G 3/0487 |
| | | | | 138/116 |
| 2013/0147239 A1 * | 6/2013 | Guering | ............... | B64D 10/00 |
| | | | | 297/185 |

\* cited by examiner

OXYGEN MASK ASSEMBLY WITH OPTIMIZED PACKAGE SIZE

CROSS REFERENCE TO RELATED APPLICATIONS

This application claims the benefit of U.S. Provisional Application No. 62/703,334, filed Jul. 25, 2018, the entirety of which is incorporated herein by reference.

FIELD OF THE INVENTION

The present invention relates generally to an oxygen mask assembly, and more particularly to an oxygen mask assembly with a hose that includes the ability to connect separate coils of the hose to one another.

BACKGROUND OF THE INVENTION

Typical oxygen masks, regardless of whether they provide a breathing bag or a flow indicator, are equipped with oxygen hoses with a smooth outer surface. Packaging of the mask hose results typically in a voluminous ravel of the hose. In some cases, clamps are attached to the oxygen hose to fix segments of the hose against each other or to the mask body and upon mask deployment the clamps become loose and fall to the ground or are dispersed in an uncontrolled manner, which is a big drawback for a passenger cabin application.

Within airplanes, the available spaces for oxygen system installations have become smaller and smaller with new cabin designs. The existing passenger mask design is limited with regard to the package size, mainly due to the needed space for the packed oxygen hose.

SUMMARY OF THE PREFERRED EMBODIMENTS

In accordance with a first aspect of the present invention there is provided a hose that includes a main body portion that defines a lumen extending therethrough and includes an outer surface, at least a first axially extending protrusion extending outwardly from the main body portion, and at least a first axially extending slot defined in the outer surface of the main body portion. The hose defines a hose axis. A portion of the first axially extending protrusion is secured in a portion of the first axially extending slot. In a preferred embodiment, the first axially extending slot includes a mouth that defines a first width dimension and the first axially extending protrusion defines a second width dimension, and the first width dimension is less than the second width dimension.

In a preferred embodiment, the hose includes a second axially extending protrusion extending outwardly from the main body portion and a second axially extending slot defined in the outer surface of the main body portion. The second axially extending protrusion is positioned at a first angle from the first axially extending protrusion, and the second axially extending slot is positioned at a second angle from the first axially extending slot. Preferably, the second axially extending slot is defined between the first and second axially protrusions. In a preferred embodiment, the first angle and the second angle are the same. However, in another embodiment, the first and second angles can be different. The first axially extending protrusion can include a plurality of sub-protrusions and the first axially extending slot can include a plurality of sub-slots.

In accordance with another aspect of the present invention there is provided an oxygen mask assembly that includes an oxygen mask, and a hose connected to the oxygen mask. The hose includes a main body portion that defines a lumen extending therethrough and includes an outer surface, at least a first axially extending protrusion extending outwardly from the main body portion, and at least a first axially extending slot defined in the outer surface of the main body portion. A portion of the first axially extending protrusion is secured in a portion of the first axially extending slot.

In accordance with another aspect of the present invention there is provided a method of coiling or securing a hose. The hose includes a main body portion that defines a lumen extending therethrough and includes an outer surface, at least a first axially extending protrusion extending outwardly from the main body portion and at least a first axially extending slot defined in the outer surface of the main body portion. The method includes the steps of coiling the hose to provide first and second sections, and securing a portion of the first axially extending protrusion that is located in the first section within a portion of the first axially extending slot that is located in the second section. The method also includes the step of pulling the first axially extending protrusion out of the second axially extending protrusion. In an embodiment where the hose is part of an oxygen mask assembly, the method includes positioning the oxygen mask assembly in a container, deploying the oxygen mask assembly (such that it drops out of the container), pulling the first axially extending protrusion out of the second axially extending protrusion, and placing the oxygen mask over a user's mouth.

In a preferred embodiment, the oxygen mask assembly described herein is used onboard passenger aircraft. For example, the passenger mask may be disposed in oxygen boxes, passenger service units with oxygen supply, and/or in portable and fixed and first aid breathing equipment. Exemplary aircraft where the invention can be used include business, commercial and military aircraft. However, use in an aircraft is not a limitation on the present invention. For example, the oxygen mask assembly can also be used in the medical and safety equipment fields.

One of the objectives of the present invention is to reduce the package size of a packed oxygen mask, thus reducing the overall dimensions of the oxygen equipment, including oxygen boxes, passenger service units and fixed or portable oxygen units.

It will be appreciated by those of ordinary skill in the art that the passenger mask of the present invention, regardless of whether it is equipped with a breathing bag or with a flow indicator, is equipped with a hose preferably having a contoured outer hose surface. The hose preferably includes at least one key and one slot oriented in the axial hose direction. The key and slot provide the ability to attach portions (e.g., coils) of the hose to one another to create a desired shape to allow for improved packaging with a reduced package size when compared to the prior art. Different suitable key slot designs, which retain the hose portions fixed together and release the hose under a reasonable pull force, are possible, e.g., straight key slot design, dove tail key slot design, fir tree key slot design, etc. It will be appreciated by those of ordinary skill in the art that the number of slots and keys, increases the flexibility of possible hose storage configurations.

In a preferred embodiment, the inventive passenger oxygen mask assembly includes a breathing bag equipped with a contoured oxygen hose and a flow indicator. The mask includes a tightening strap, a face piece, a valve plate, and an actuation lanyard with attachment rings. However, the type of mask is not a limitation on the present invention and any mask known in the art (and components therefore) can be used. In another embodiment, a passenger oxygen mask assembly without a breathing bag is provided and equipped with the contoured oxygen hose and the flow indicator. The mask includes a tightening strap, face piece, valve plate and actuation lanyard with attachment rings. Embodiments of the present invention include a hose with a straight key and a straight slot, and a hose with a dove tail design that includes four keys and four slots (any number of keys and slots is within the scope of the present invention). The hose can be oriented in a cylindrical spiral arrangement, a conical spiral arrangement or a flat spiral arrangement of the hose. Other arrangements are also possible.

A combination of some or all of the hose arrangements described herein is also possible, thus allowing the oxygen hose to be positioned in or fill the internal volume of the mouthpiece of the oxygen mask or any other suitable space within the oxygen compartment.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 1:
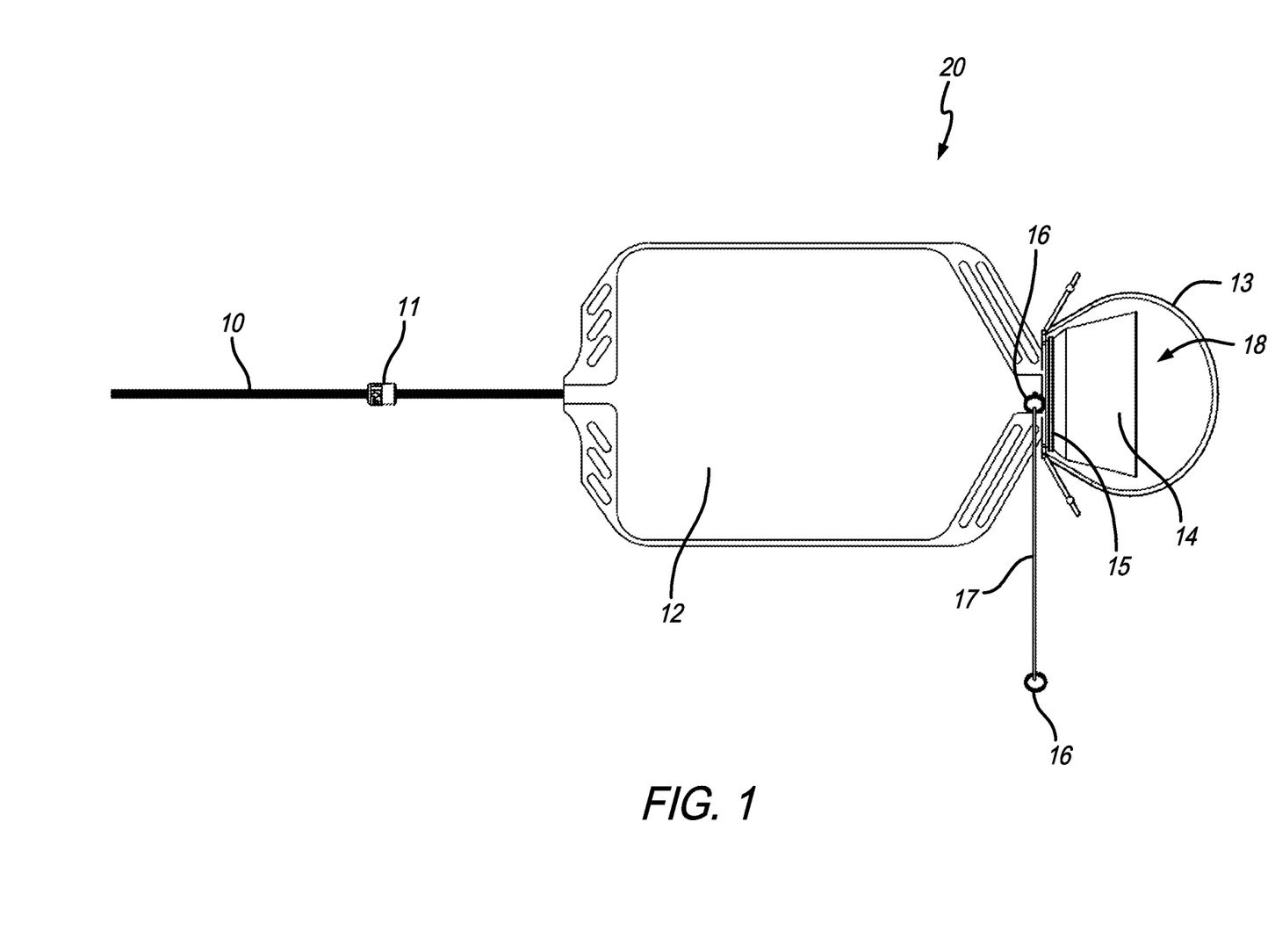
FIG. 1 is a side elevational view of an oxygen mask assembly in accordance with a preferred embodiment of the present invention.
Figure 2:
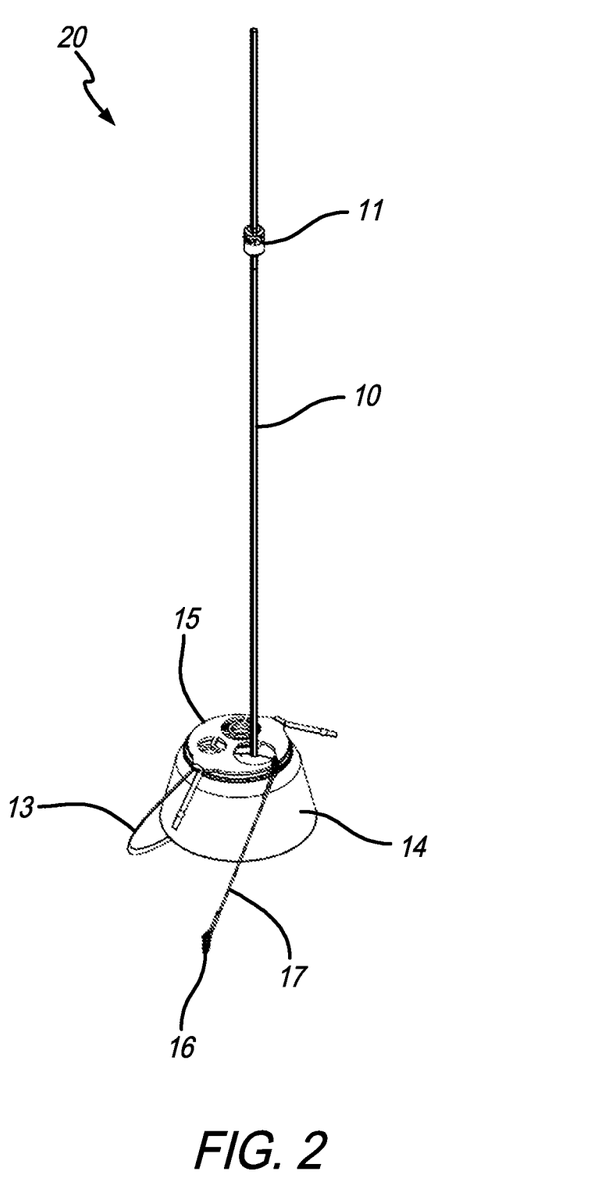
FIG. 2 is a perspective view of an oxygen mask assembly.

Referring now to the drawings, which are for purposes of illustrating the present invention and not for purposes of limiting the same, the drawings show an oxygen mask assembly 20 that includes a hose 10 with provisions for securing portions of the outer surface of the hose to one another. FIG. 1 shows the oxygen mask assembly 20 with a breathing bag 12 and FIG. 2 shows the oxygen mask assembly 20 without a breathing bag. As shown in FIG. 1, in a preferred embodiment, the oxygen mask assembly 20 includes the breathing bag 12, hose 10, a flow indicator 11 and a mask 18. The mask 18 includes a tightening strap 13, a face piece 14, a valve plate 15, and an actuation lanyard 17 with attachment rings 16. As shown in FIG. 2, in another preferred embodiment, the oxygen mask assembly 20 includes the flow indicator 11 and the mask 18. Any oxygen mask assembly or oxygen mask configuration is within the scope of the present invention.

Figure 3:
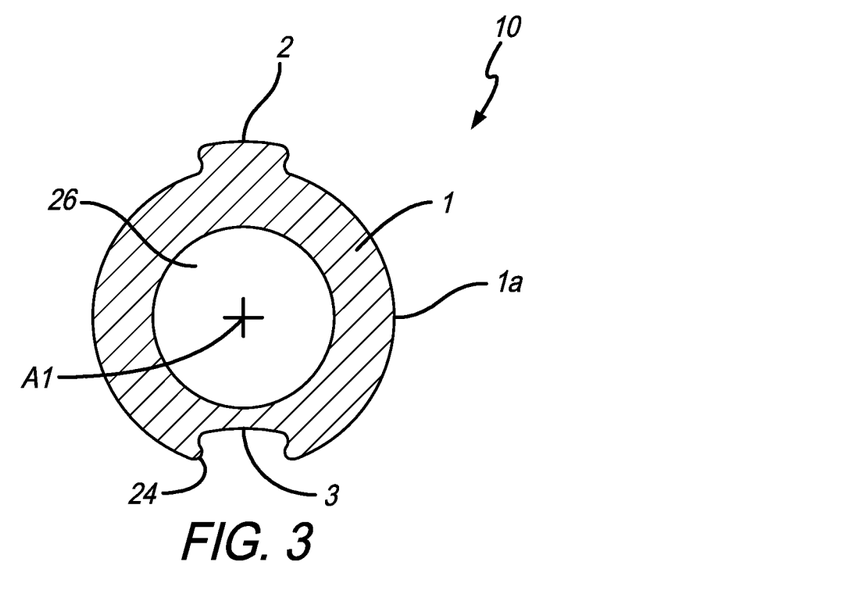
FIG. 3 is a cross-section of a hose in accordance with a preferred embodiment of the present invention.
Figure 4:
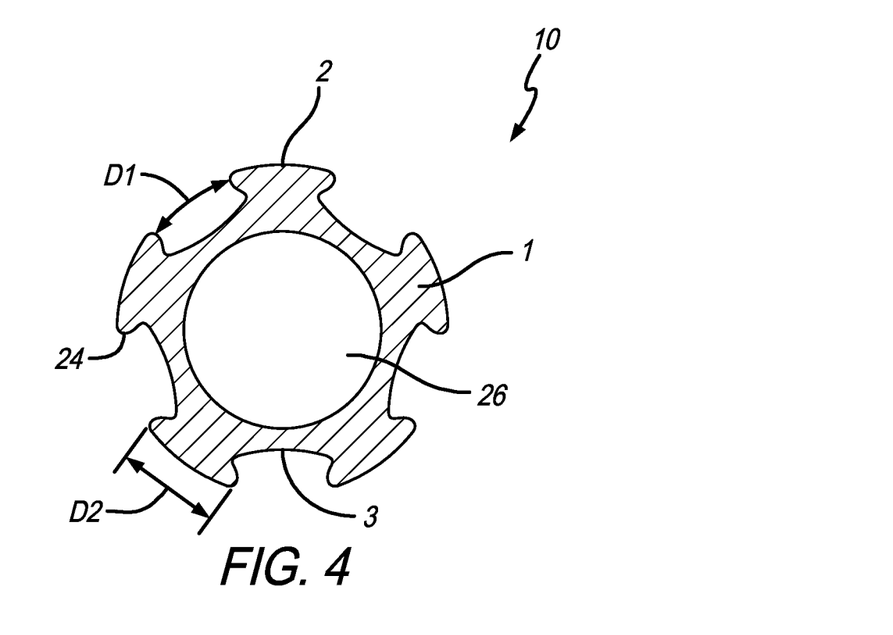
FIG. 4 is a cross-section of a hose in accordance with a preferred embodiment of the present invention.
Figure 10:
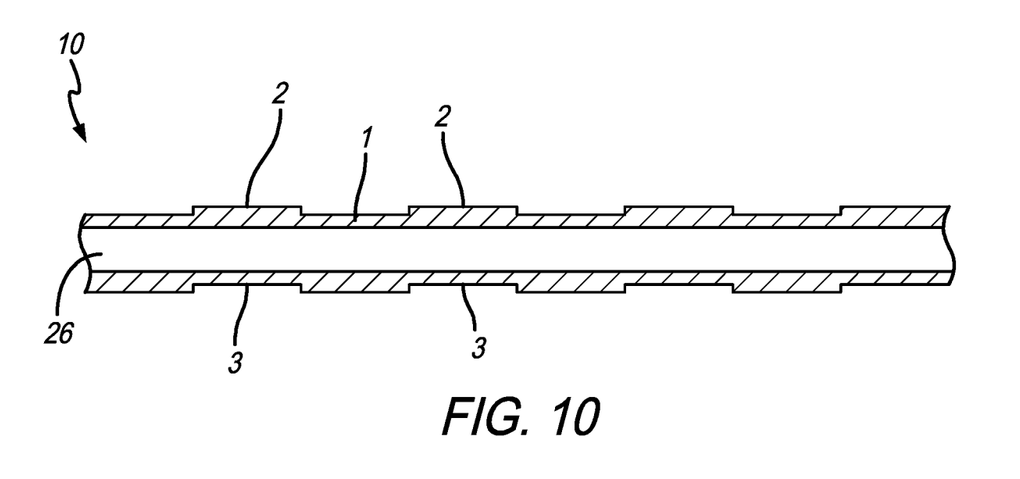
FIG. 10 is a cross-sectional side elevational view of a hose with a plurality of axially extending sub-protrusions and sub-slots that are aligned axially and are dispersed along the length of the hose to form a first axially extending protrusion and a first axially extending slot.

As shown in FIGS. 3-4, the hose 10 includes a main body portion 1 that defines a lumen 26 extending therethrough and includes an outer surface 1a. The lumen 26 defines a hose axis A1. The main body portion 1 preferably includes at least one key or axially extending protrusion 2 extending outwardly therefrom and one keyway or axially extending slot 3 defined in the outer surface 1a thereof. The axially extending protrusion 2 and axially extending slot 3 are oriented such that they extend in the axial hose direction. The hose 10 can include a single axially extending protrusion 2 and axially extending slot 3 that extend all or most of the length of the hose or can include a series of axially extending protrusions and axially extending slots that are aligned axially and are dispersed along the length of the hose, as shown in FIG. 10. The series of axially extending protrusions are referred to herein as sub-protrusions and the series of axially extending slots are referred to herein as sub-slots. The series of axially extending protrusions 2 and slots 3 may also be referred to herein as a single axially extending protrusion or slot as they accomplish the same securement of sections of the hose together as the single axially extending protrusion and slot. The protrusions 2 and slots 3 are configured such that in use a portion of an axially extending protrusion 2 is secured in a portion of an axially extending slot 3.

As shown in FIG. 4, the hose 10 can include a plurality of axially extending protrusions 2 and axially extending slots 3 that are positioned radially around the circumference of the hose 10. This allows for a variety of locations where different sections of the hose 10 can be attached to one another. In other words, the plurality of axially extending protrusions 2 and axially extending slots 3 are oriented at different angles (or different positions relative to a clock) around the circumference of the main body portion 11 of the hose 10. FIG. 4 shows five (or first through fifth) axially extending protrusions 2 oriented at approximately 72° from one another and five (or first through fifth) axially extending slots 3 oriented at approximately 72° from one another. Any number of circumferentially oriented protrusions and slots are within the scope of the present invention (e.g., 2-10 each).

Figure 5:
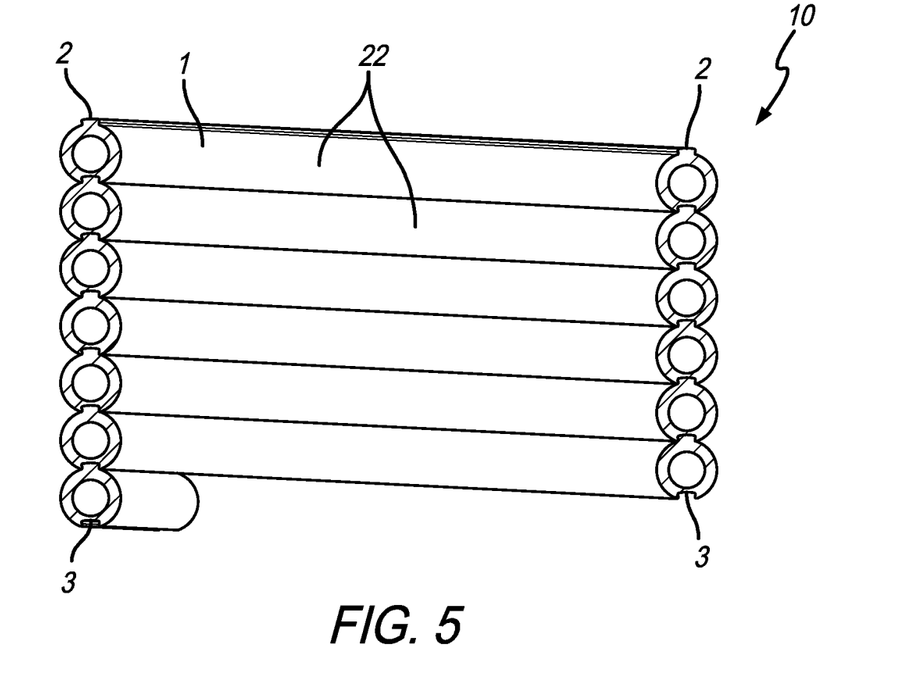
FIG. 5 is a cross-section of a vertically coiled hose in accordance with a preferred embodiment of the present invention.
Figure 6:
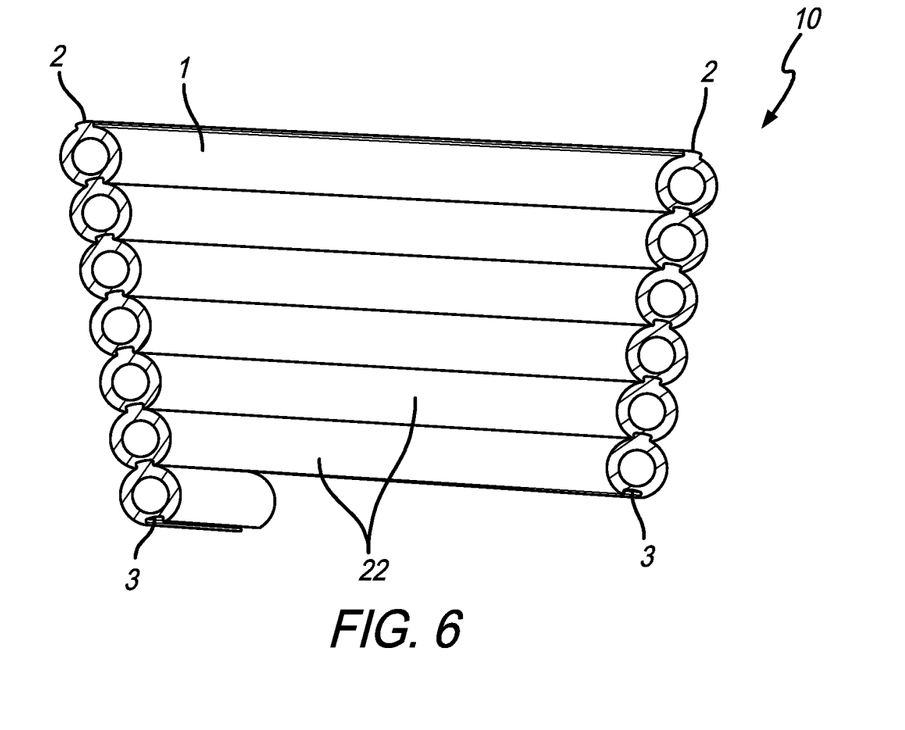
FIG. 6 is a cross-section of a funnel shaped coiled hose in accordance with a preferred embodiment of the present invention.
Figure 7:
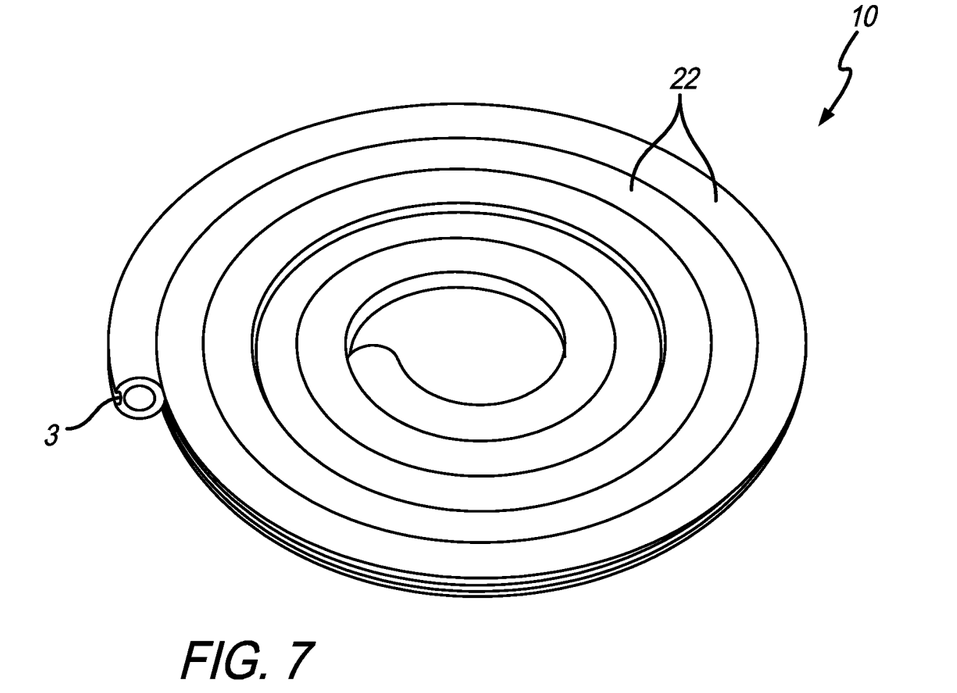
FIG. 7 is a perspective view of a cross-section of a horizontally coiled hose in accordance with a preferred embodiment of the present invention.
Figure 8:
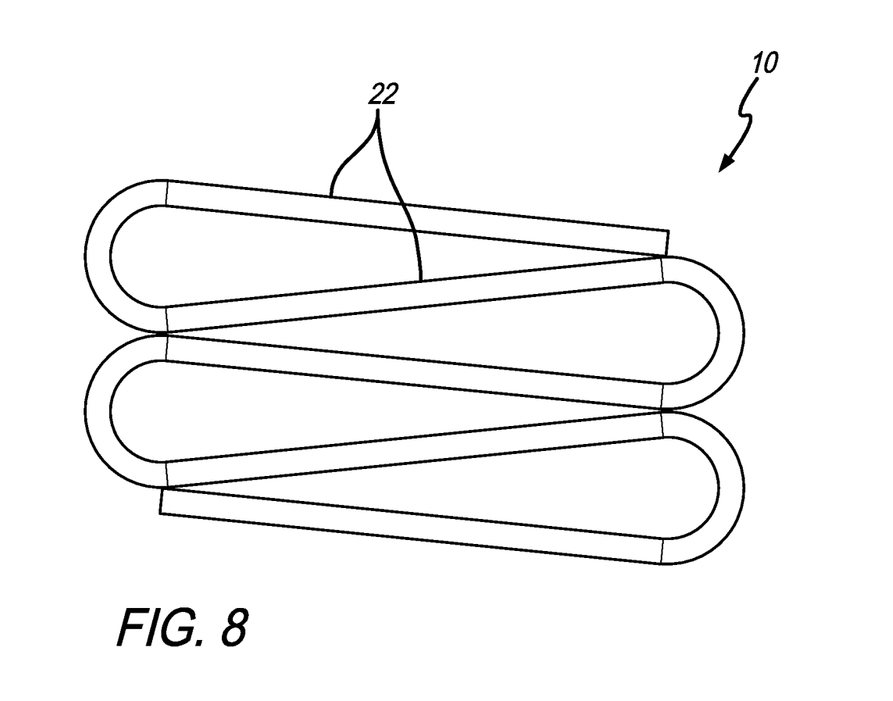
FIG. 8 is an elevational view of a configuration of a hose with sections secured together.
Figure 9:
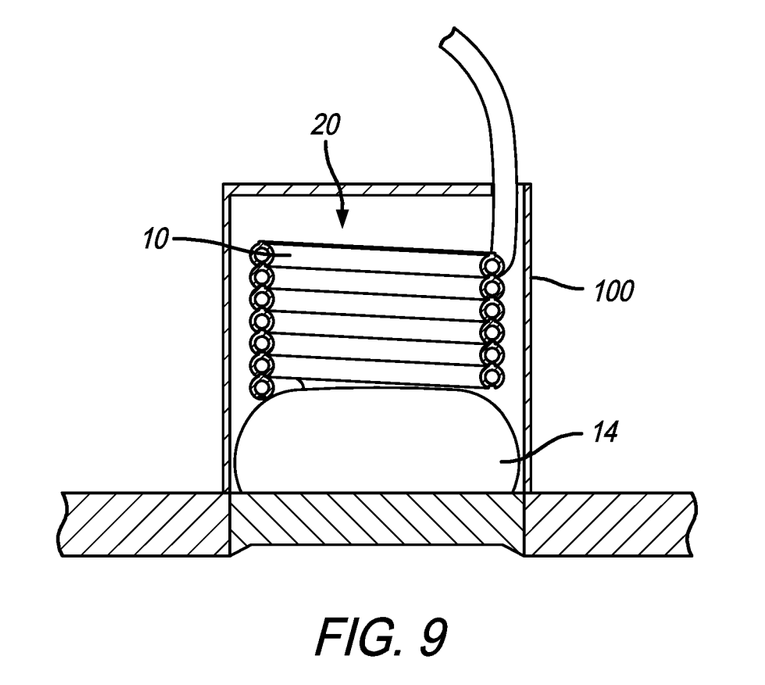
FIG. 9 is a cross-section of an oxygen mask assembly in a container.

As shown in FIGS. 5-6, the protrusion 2 and slot 3 provide the ability to attach sections 22 (e.g., coils) of the hose 10 to one another. The sections are labeled 22 in the drawings. However, it will be appreciated that the sections are not necessarily discreet sections that are always the same. The inventive feature is that the hose 10 can be connected to itself to hold the coils or other sections 22 together. This is advantageous when fitting the hose 10 into a small space, such as on the inside of a container 100 (see FIG. 9) that holds the oxygen mask assembly 20 and/or the hose 10. It will be appreciated by those of ordinary skill in the art that the number of slots and protrusions dispersed around the circumference, increases the flexibility of the possible hose storage configurations.

Referring again to FIGS. 3-4, in a preferred embodiment, the hose of made of plastic or other malleable material that allows the protrusion(s) 2 to be secured into the slot(s) 3. Securement can be done by snap fit, friction fit, press fit or any other configuration that allows the protrusion 2 to be secured in the slot 3 and for the protrusion 2 to be pulled back out of the slot 3 by a user so that the hose can thereafter be extended (e.g., when the oxygen mask is used in an emergency situation). This can generally be accomplished by the slot 3 including a mouth 24 that has a smaller width dimension D1 than the width widest dimension D2 of the protrusion 2 (see FIG. 4). It will be appreciated by those of ordinary skill in the art that the protrusion and slot include complementary shapes so that the protrusion 2 can be secured into the slot 3. Different suitable protrusion and slot designs are within the scope of the present invention, which retain the hose sections 22 fixed together and release the hose 10 (i.e., the protrusion 2 can be pulled from the slot 3) under a reasonable pull force. For example, a straight protrusion slot design, a dove tail key slot design, a fir tree key slot design, etc. are all within the scope of the present invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A hose comprising:
   a main body portion that defines a lumen extending therethrough and includes an outer surface, wherein the hose defines a hose axis,
   a first axially extending protrusion extending outwardly from the main body portion,
   a first axially extending slot defined in the outer surface of the main body portion,
   a second axially extending protrusion extending outwardly from the main body portion, and
   a second axially extending slot defined in the outer surface of the main body portion,
   wherein the second axially extending slot is defined between and delimited by the first and second axially extending protrusions, wherein the second axially extending protrusion is configured to be securable in the second axially extending slot and is configured to be securable in the first axially extending slot, wherein the first axially extending protrusion is configured to be securable in the second axially extending slot, wherein the interface between each of the first and second axially extending protrusions and each of the first and second axially extending slots are configured to lock with one another.

2. The hose of claim 1 wherein the first axially extending slot includes a mouth that defines a first width dimension and the first axially extending protrusion defines a second width dimension, and wherein the first width dimension is less than the second width dimension.

3. The hose of claim 1 wherein the second axially extending protrusion is positioned at a first angle from the first axially extending protrusion, wherein the second axially extending slot is positioned at a second angle from the first axially extending slot, and wherein the first angle and the second angle are the same.

4. The hose of claim 1 wherein the first axially extending protrusion comprises a plurality of sub-protrusions.

5. An oxygen mask assembly comprising:
   an oxygen mask, and
   a hose connected to the oxygen mask, wherein the hose includes
   a main body portion that defines a lumen extending therethrough and includes an outer surface, wherein the lumen defines a hose axis,
   a first axially extending protrusion extending outwardly from the main body portion, and
   a first axially extending slot defined in the outer surface of the main body portion, wherein a portion of the first axially extending protrusion is secured in a portion of the first axially extending slot,
   a second axially extending protrusion extending outwardly from the main body portion, and
   a second axially extending slot defined in the outer surface of the main body portion,
   wherein the second axially extending slot is defined between and delimited by the first and second axially extending protrusions, wherein the second axially extending protrusion is configured to be securable in the second axially extending slot and is configured to be securable in the first axially extending slot, wherein the first axially extending protrusion is configured to be securable in the second axially extending slot, wherein the interface between each of the first and second axially extending protrusions and each of the first and second axially extending slots are configured to lock with one another.

6. The oxygen mask assembly of claim 5 wherein the first axially extending slot includes a mouth that defines a first width dimension and the first axially extending protrusion defines a second width dimension, and wherein the first width dimension is less than the second width dimension.

7. The oxygen mask assembly of claim 5 wherein the second axially extending protrusion is positioned at a first angle from the first axially extending protrusion, wherein the second axially extending slot is positioned at a second angle from the first axially extending slot, and wherein the first angle and the second angle are the same.

8. The oxygen mask assembly of claim 5 wherein the first axially extending protrusion comprises a plurality of sub-protrusions.

9. A method of coiling a hose that includes a main body portion that defines a lumen extending therethrough and includes an outer surface, a first axially extending protrusion extending outwardly from the main body portion, and a first axially extending slot defined in the outer surface of the main body portion, a second axially extending protrusion extending outwardly from the main body portion, and a second axially extending slot defined in the outer surface of the main body portion, wherein the second axially extending slot is defined between and delimited by the first and second axially extending protrusions, wherein the second axially extending protrusion is configured to be securable in the second axially extending slot and is configured to be securable in the first axially extending slot, wherein the first axially extending protrusion is configured to be securable in the second axially extending slot, wherein the interface between each of the first and second axially extending protrusions and each of the first and second axially extending slots are configured to lock with one another, the method comprising the steps of:
   coiling the hose to provide first and second sections, and
   securing a portion of the first axially extending protrusion that is located in the first section within a portion of the first axially extending slot that is located in the second section.

* * * * *